July 7, 1964     H. OETIKER     3,139,708
DEVICE FOR THE TREATMENT OF SMALL GOODS
Filed Jan. 6, 1959
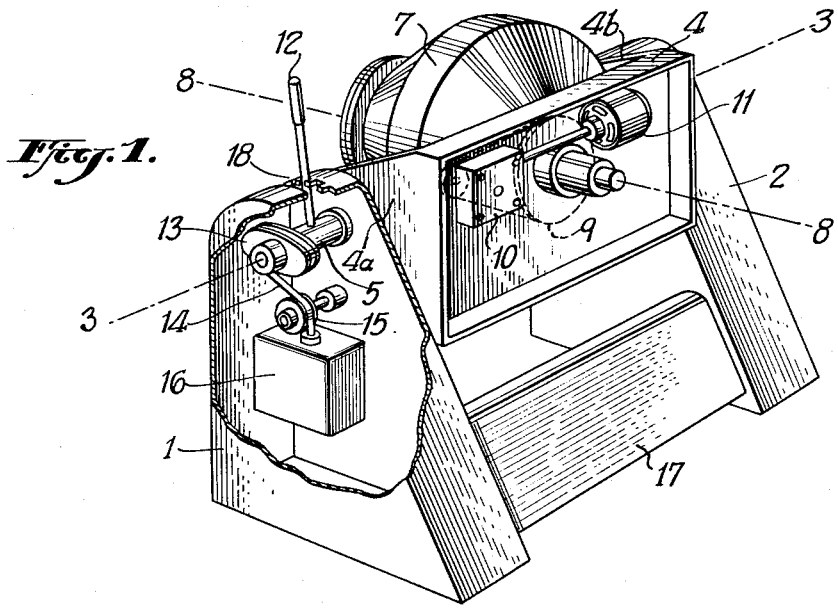
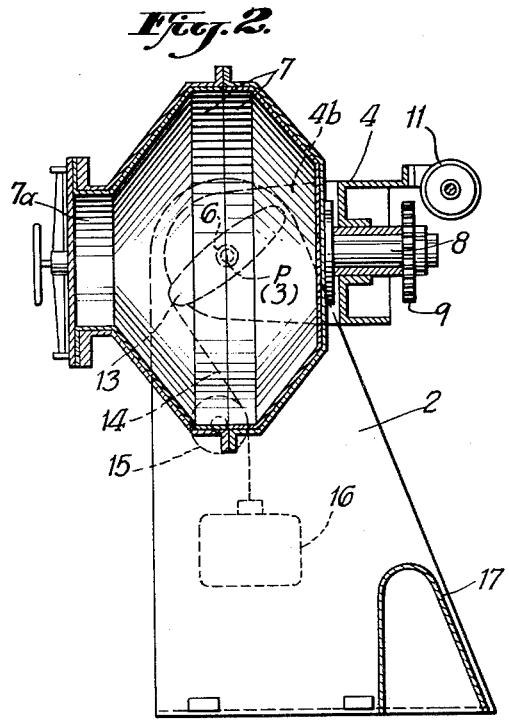
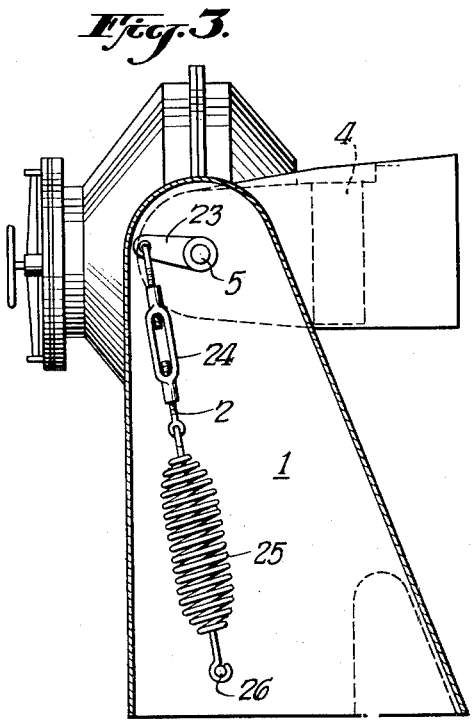
INVENTOR
HANS OETIKER.
BY
ATTORNEY

United States Patent Office 3,139,708
Patented July 7, 1964

3,139,708
DEVICE FOR THE TREATMENT OF SMALL GOODS
Hans Oetiker, Oberdorfstrasse 21, Horgen, Switzerland
Filed Jan. 6, 1959, Ser. No. 785,285
Claims priority, application Switzerland Jan. 8, 1958
7 Claims. (Cl. 51—164)

The invention concerns a device for the treatment of small goods by mixing whereby the sharp edges of the individual pieces are ground away, comprising a rotatable drum mounted in a swiveled carrier, the axis of rotation of the drum being perpendicular to the pivot axis of the carrier.

With such devices it is known to arrange the rotatable drum on one side of the tipping axis. The driving mechanism is on the other side of the pivot axis. The pivot axis thus lies between the center of gravity of the drum and the center of gravity of the drive. This arrangement possesses the disadvantage that when the drum is filled with small goods it becomes top heavy, while when it is empty the weight of the drive pulls it in the other direction, that is the arrangement is bottom heavy. This necessitates the provision of special measures in order to balance these forces. Moreover it is a drawback that when the drum is being filled the filling opening is directed upwards. This makes it difficult for the operator to fill the drum and to check the goods in the drum when this is necessary. Conversely, when the goods have to be tipped out of the drum, the opening is very low, so that there is hardly any room underneath the drum for a receiver.

These disadvantages are eliminated by the invention.

According to the invention the swiveled carrier is made U-shaped and the pivot for the carrier is divided into two sections which are supported in a rotatable manner, and the swiveled carrier is fixed to the ends of the pivot sections, the rotatable drum being so arranged within the carrier that its center of gravity lies at least approximately in the pivot axis.

The invention will be explained hereinafter by means of a constructional example. FIG. 1 shows the device in a perspective view from the driving side thereof. FIG. 2 is a cross-sectional view along the plane of symmetry. FIG. 3 shows a modified form of the invention.

The U-shaped carrier 4 which is located in the pivot axis 3 and mounted on the two pivot sections 5 and 6 formed as short stubs, is mounted between the columns 1 and 2 which are held together by the cross-piece 17. The pivot sections 5 and 6 hold the swiveled carrier 4 at its ends or legs 4a and 4b. The rotatable drum 7 is disposed within the U-shaped part of the swiveled carrier 4. The drum 7 is so arranged in the carrier 4 that the mid-point P of the filling space of the drum 7 lies in the pivot axis. The center of gravity of the goods after the drum is filled is thus also at least approximately at the center of the filling space and therefore also within the pivot axis.

The rotation of the drum 7 is achieved by way of a revolving shaft 8 which in turn is driven by a motor 11 by means of a gear wheel 9 and a gear located in the casing 10. By this means the goods in the drum 7 are mixed continuously, whereby the sharp edges of the individual pieces are ground away. A lever 12 is provided for swiveling the pivot arm. The drum 7 can be fixed in various positions by means of the notches 18.

The pivot section 5 is provided with a cam 13. A flexible tension element 14, for instance a steel band, is wound around this cam 13 and passes over a roller 15. A weight 16 hangs on the end of the steel band. The arrangement is located inside the column 1.

The arrangement of the rotatable drum 7 in such a manner that its center lies in the pivot axis, has the advantage that the rotatable drum 7 is practically completely in equilibrium in every position of rotation. This balance is maintained even when the drum 7 is completely filled. As a result thereof, the drum 7 can be rotated by a very small force even when it is full, it being possible to rotate it by hand. A special drive is not necessary for this purpose.

A further advantage of locating the center point P on the pivot axis is that the drum opening 7a, when it is directed upwards, is not too high. This facilitates the filling operation. On the other hand when the opening is directed downwards to enable the drum 7 to be emptied, the opening is still high enough above the ground to enable a container to be pushed underneath the drum 7 for collecting the goods during the discharging operation.

The difference in height of the drum opening during charging and discharging is small, so that with a simple construction it is easy to operate the drum 7. The weight of the swiveled carrier 4 and the drum driving mechanism 9, 10, 11 arranged on one side of the carrier 4 can be compensated in every position by suitably selecting the radius of curvature of cam 13 for the band 14 and the weight 16. The position of the cam 13 on the pivot section 5 is so selected that when the revolving shaft 8 is in the horizontal position where the excess weight of the swiveled carrier and the drum drive is a maximum, the radius of curvature of the band 14 with respect to the axis of rotation 3 and thus the counter-torque is also a maximum. The radius of curvature is a minimum when the shaft 8 stands approximately vertically and the drum opening is thus directed either upwards or downwards. The amount of filling in the drum 7 has practically no effect on the balance of the swiveled carrier 4 and its associated parts.

Fundamentally it is also possible to balance the swiveled carrier 4 and the elements associated therewith by means of a counterweight which can swing about the axis of rotation 3, instead of a cam balancing device. Such a weight would, however, be a handicap because it would have to be located on the operating side.

Balancing could also be achieved in an advantageous manner by replacing the weight, which exerts a pull in the opposite direction, by a tension spring, whereby the cam in each tipping position has such a radius that the weight is balanced for every position of the drum. The drum is then swiveled by applying only a slight force to lever 12 (FIG. 1). It is only necessary then to overcome primarily the friction in the bearings.

By using the spring a considerable saving in weight can be achieved. The machine can be completed in the factory and it is not necessary to fit a counter-weight to it after it has been installed on the operating site.

Moreover if precise balancing is not necessary, which in view of the prevailing frictional force is quite feasible, then the cam 13 and the tension band 14 can be replaced by a simple lever.

Such a modified form of the invention is shown in FIG. 3. Reference number 5 indicates one of the supporting colums. Lever 23 is mounted on the rotatable pivot section 5. A tension spring 25 is suspended on its free end from the lever 23 by way of a turnbuckle 24. The other end of the spring 25 is attached to a stationary bolt 26. The spring 25 is preferably of the double conical type.

FIG. 3 shows the middle tipping position where the swiveled carrier 4 has a maximum overhang. In this position the spring 25 has to produce a maximum counter-torque. If the drum 7 is tilted upwards for filling or downwards for discharging, the torque produced by the overhang diminishes. The counter-torque of the spring 25 decreases correspondingly, due to the fact that the distance between the center line through the spring and the axis of rotation also decrease. It is expedient if the spring 25, when in the closed position, that is when the opening in the drum is directed downwards, is already prestressed to a certain extent.

I claim:

1. A tumbler for treating small goods comprising a stationary support comprising two column members connected by a cross piece, one of said column members having a hollow portion, a U-shaped carrier having a web portion and two legs extending therefrom, means enabling the carrier to be connected to and swingably supported by said support on a pivot axis, said means comprising a pivot means mounted on each of said legs, one of said pivot means being rotatably supported by said one of said two column members and extending into the interior of said hollow portion, the other of said pivot means being rotatably supported by the other of said two column members, a drum disposed between said legs and a drive shaft connected to said drum to rotate the same on an axis substantially normal to said pivot axis, supporting means for said drive shaft on said web portion, said pivot axis of said carrier extending substantially through the center of gravity of the drum, drive means operatively connected to said drive shaft for rotating said drum, said drive shaft extending through said web portion, said drive means being mounted on said web portion, and a balancing means connected to said carrier for counter balancing the weight of said carrier, said balancing means including an arm extending from said one of said pivot means, and a tension spring having an end connected to said arm and having a second end connected to said one of said column members, said arm and said spring being disposed within the said interior of said hollow portion.

2. A tumbler for treating small goods, comprising:
a stationary support including two upright members,
a substantially U-shaped carrier having a substantially transversely extending web portion and two leg portions extending therefrom,
means for pivotally supporting said carrier on said stationary support about an essentially transverse pivot axis including one pivoting member each for supporting a respective leg portion in a corresponding upright member,
a drum disposed between said leg portions and a drive shaft securely connected to said drum,
bearing means for said drive shaft in said web portion and constituting the sole support of said drum on said carrier,
the axis of said drive shaft being substantially perpendicular to said pivot axis and said pivot axis extending at least approximately through the center of gravity,
drive means for said drive shaft including an electric motor mounted on said web portion and gear means operatively connecting said motor with said drive shaft so that said web portion and drive means constitute a mass capable of producing a moment about said pivot axis the magnitude of which depends on the angular position of said carrier,
and means for counterbalancing the last-mentioned moment including means for producing a counter-moment the magnitude of which also varies in dependence on said angular position.

3. A tumbler for treating small goods, comprising:
a stationary support including two upright members,
a substantially U-shaped carrier having a substantially transversely extending web portion and two leg portions extending therefrom,
means for pivotally supporting said carrier on said stationary support about an essentially transverse pivot axis including one pivoting member each for supporting a respective leg portion in a corresponding upright member,
a drum disposed between said leg portions and a drive shaft securely connected to said drum,
bearing means for said drive shaft in said web portion and constituting the sole support of said drum on said carrier,
the axis of said drive shaft being substantially perpendicular to said pivot axis and said pivot axis extending at least approximately through the center of gravity,
drive means for said drive shaft including an electric motor mounted on said web portion and gear means operatively connecting said motor with said drive shaft so that said web portion and drive means constitute a mass capable of producing a moment about said pivot axis the magnitude of which depends on the angular position of said carrier,
and means for counterbalancing the last-mentioned moment including means for producing a counter-moment the magnitude of which also varies in dependence on said angular position,
said last-mentioned means including a cam connected for rotation in unison with said carrier and having a varying radial dimension with the maximum radial dimension thereof coinciding approximately with the axis of said drive shaft, and a counterweight suspended from a flexible element adapted to be wound on said cam.

4. A tumbler for treating small goods, comprising:
a stationary support including two upright members,
a substantially U-shaped carrier having a substantially transversely extending web portion and two leg portions extending therefrom,
means for pivotally supporting said carrier on said stationary supporting about an essentially transverse pivot axis including one pivoting member each for supporting a respective leg portion in a corresponding upright member,
a drum disposed between said leg portions and a drive shaft securely connected to said drum,
bearing means for said drive shaft in said web portion and constituting the sole support of said drum on said carrier,
the axis of said drive shaft being substantially perpendicular to said pivot axis and said pivot axis extending at least approximately through the center of gravity,
drive means for said drive shaft including an electric motor mounted on said web portion and gear means operatively connecting said motor with said drive shaft so that said web portion and drive means constitute a mass capable of producing a moment about said pivot axis the magnitude of which depends on the angular position of said carrier,
and means for counterbalancing the last-mentioned moment including means for producing a counter-moment the magnitude of which also varies in dependence on said angular position,
said last-named means including a lever extending in a direction substantially radial with respect to said pivot axis and a tension spring connected at one end to said lever and at the other end to said stationary support.

5. A tumbler for treating small goods, comprising:
a stationary support including two upright members,
a substantially U-shaped carrier having a single substantially transversely extending web portion and two leg portions extending therefrom,
means for pivotally supporting said carrier on said stationary support about an essentially transverse pivot axis including one pivoting member each for supporting a respective leg portion in a corresponding upright member,
a drum disposed between said leg portions and a drive shaft securely connected to said drum,
bearing means for said drive shaft in said single web portion and constituting the sole support of said drum on said carrier, the axis of said drive shaft being substantially perpendicular to said pivot axis and said pivot axis extending at least approximately through the center of gravity, drive means for said drive shaft including an electric motor mounted on said web portion on the side opposite said drum and gear means operatively connecting said motor with said drive shaft so that said web portion and drive means constitute a mass capable of producing a moment about said pivot axis the magnitude of which depends on the angular position of said carrier, and means for counterbalancing the last-mentioned moment including means for producing a countermoment the magnitude of which also varies in dependence on said angular position.

6. A tumbler for treating small goods comprising a stationary support, a U-shaped carrier having a web portion and legs extending therefrom, means enabling said carrier to be connected to and supported by said support on a pivot axis, a drum disposed between said legs, a drive shaft connected to said drum to rotate the same on an axis substantially normal to said pivot axis, supporting means for said drive shaft on said web portion, the pivot axis of said carrier extending substantially through the center of gravity of said drum, drive means for said drive shaft including a motor mounted on said web portion and drivingly connected with said drive shaft, and a balancing means connected to said carrier for counterbalancing the weight of said carrier and of the drive means including means for automatically varying the effective countertorque in dependence on the angular position of said carrier.

7. A tumbler as defined in claim 6, wherein said means enabling said carrier to be connected to and supported by said support includes a pivot means mounted on each of said legs and individually extending through said support for swingably supporting said carrier on said pivot axis, said balancing means including an arm extending from one of said pivot means and a tension spring having an end connected to said arm and having a second end connected to said support.

References Cited in the file of this patent

UNITED STATES PATENTS

| | | |
|---|---|---|
| 433,663 | Taylor | Aug. 5, 1890 |
| 937,359 | Clark | Oct. 19, 1909 |
| 1,010,229 | Bull | Nov. 28, 1911 |
| 1,122,659 | Sturtevant | Dec. 29, 1914 |
| 1,534,366 | Evans | Apr. 21, 1925 |
| 1,693,935 | Nelles | Dec. 4, 1928 |
| 1,874,077 | Anderson | Aug. 30, 1932 |
| 2,099,964 | Robbins | Nov. 23, 1937 |
| 2,155,454 | Temple | Apr. 25, 1939 |
| 2,175,464 | Hoya | Oct. 10, 1939 |
| 2,688,468 | Thorstensson-Rydberg | Sept. 7, 1954 |